UNITED STATES PATENT OFFICE.

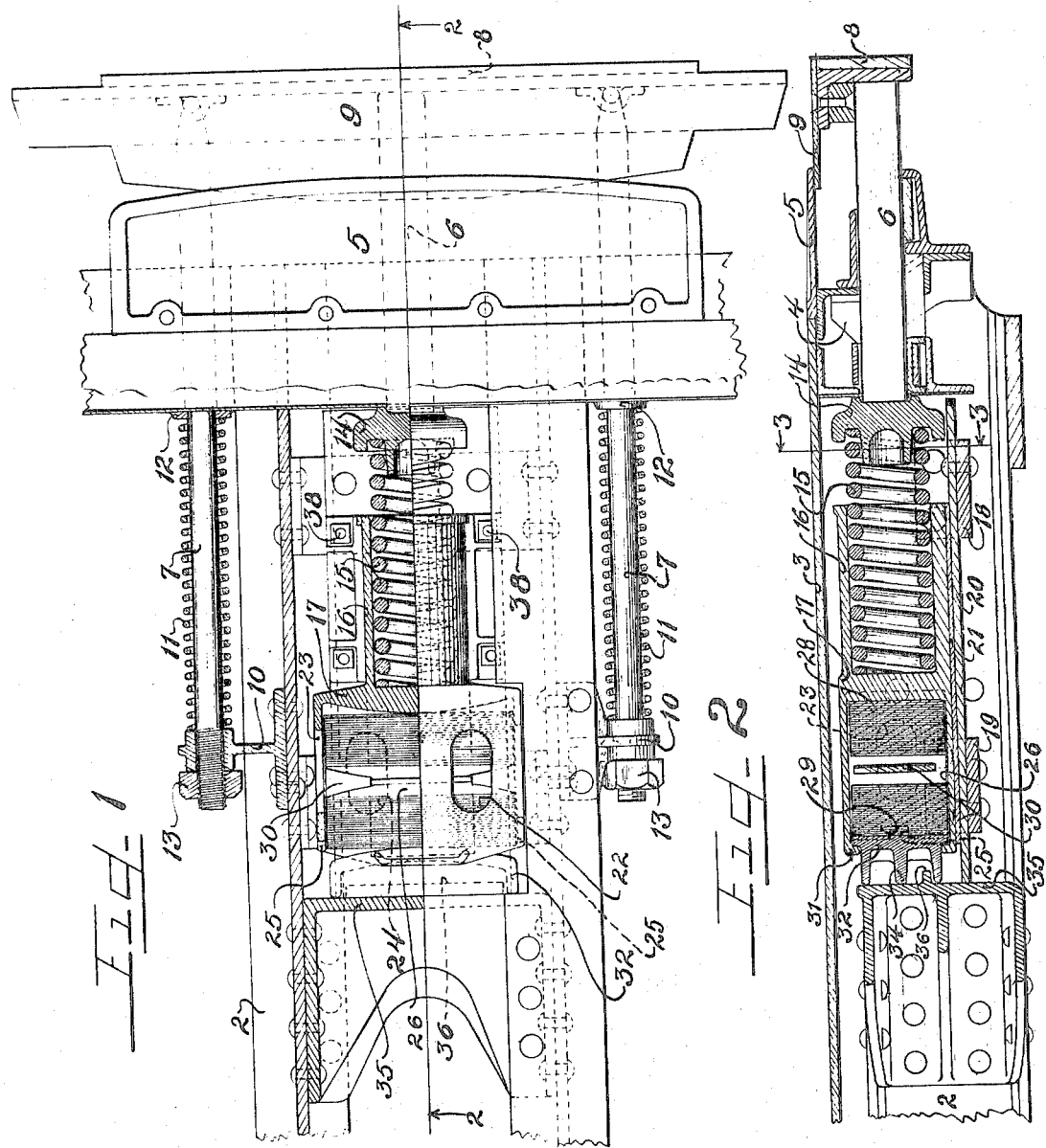

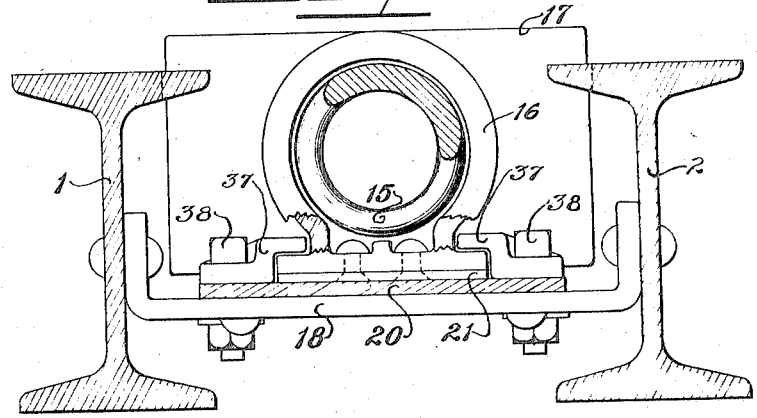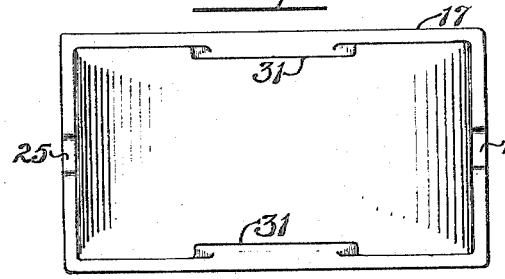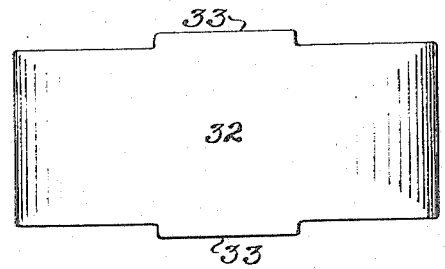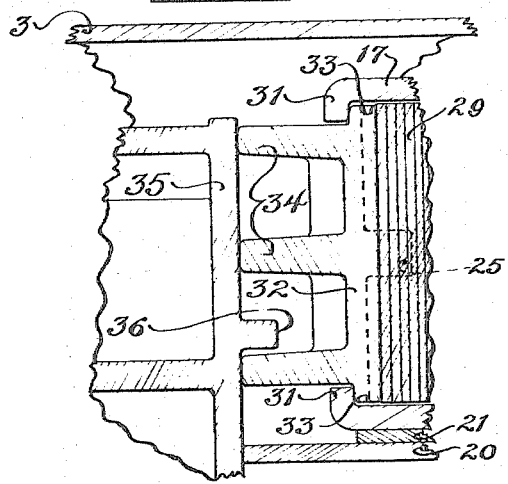

ARTHUR C. DAVIDSON, OF CHICAGO, ILLINOIS, ASSIGNOR TO WAUGH DRAFT GEAR COMPANY, OF CHICAGO, ILLINOIS, A CORPORATION OF ILLINOIS.

PLATFORM BUFFING-GEAR.

1,312,167.  Specification of Letters Patent.  Patented Aug. 5, 1919.

Application filed April 2, 1915. Serial No. 18,678.

*To all whom it may concern:*

Be it known that I, ARTHUR C. DAVIDSON, a citizen of the United States, and a resident of the city of Chicago, in the county of Cook and State of Illinois, have invented certain new and useful Improvements in Platform Buffing-Gears; and I do hereby declare that the following is a full, clear, and exact description of the same, reference being had to the accompanying drawings, and to the numerals of reference marked thereon, which form a part of this specification.

Many different types of resilient gears have been constructed for car platform buffers, but in general they have been impracticable due to the fact that it is difficult to associate the same with a car already in service, and also due to the fact that in most cases adaptation of the gear to a car under construction has necessitated a change in design of the car underframing to permit association of the gear therewith.

This invention, however, relates to an improved type of platform buffing gear which may be associated with a car necessitating only slight alterations thereof to receive the gear, and acting efficiently to receive and absorb buffing stresses and maintain the tread plates of coupled cars closely adjacent one another.

It is an object therefore of this invention to construct a platform buffing gear wherein the entire gear is itself movable within certain limits, having associated to move therewith and normally out of action, a heavy duty absorption gear to protect the car and gear under excessive buffing or impact loads.

It is also an object of this invention to construct a platform buffing gear embracing central and side absorption mechanisms, the central mechanism comprising two different types of resilient absorption means coöperatively associated to bring one into operation only after the other has been stressed to a certain amount.

It is furthermore an important object of this invention to construct a platform buffing gear embracing side and central resilient absorption means, the central means movable as a whole under excessive impact or buffing stresses to prevent destruction of the gear and to absorb excessive stresses.

It is finally an object of this invention to construct an improved type of platform buffing gear simple and compact in construction and capable of being readily adapted to different types of cars.

The invention (in a preferred form) is illustrated in the drawings and hereinafter more fully described.

In the drawings:

Figure 1 is a fragmentary top plan view of the framing of a car platform and buffer illustrating the adaptation thereto of a buffing gear embodying my invention, shown partly in section and partly in elevation.

Fig. 2 is a fragmentary detail section taken on line 2—2 of Fig. 1, with parts in elevation and parts omitted.

Fig. 3 is a detail section taken on line 3—3 of Fig. 2, with parts omitted and parts shown in elevation.

Fig. 4 is an end view of the housing with the follower and friction plates removed.

Fig. 5 is a face view of the follower plate.

Fig. 6 is a fragmentary enlarged detail section taken vertically through the rear end of the housing and follower plate.

As shown in the drawings:

The reference numerals 1 and 2, denote respectively the platform sills of a car which in the present invention are shown as I-beams. and laid thereover is the platform floor 3, with a built-up platform end sill, denoted as a whole by the reference numeral 4, extending across the end of said sills 1 and 2, and provided with a tread plate 5, flush with the floor 3, of the platform.

Slidably mounted through the platform end sill is a center stem 6, and side stems 7, and connected on the outer end of said stems 7, is a platform buffer member 8, provided with a tread plate 9, which is adapted to slide beneath the tread plate 5. The absorption gear mechanism for the platform buffer member 8, is mounted rearwardly of the platform end sill 4, and for this purpose brackets 10 are secured to the outer surface of the webs of the respective platform sills 1 and 2, to receive the side stems 7, slidably therethrough. Coiled about each of said stems 7, are compression springs 11, one end of each thereof bearing against the brackets 10, and the other ends against a collar 12, one secured upon each of the stems 7. Thus when the buffer member 8, is thrust inwardly the stems 7, moving therewith, compress the springs 11, by movement of said collars 12, toward the brackets 10. Threaded nuts 13, are engaged on the ends of said side stems 7, to hold the same inwardly against the compression of the springs 11, and it is apparent that by adjustment of said nuts the compression on said springs 11, may be varied, as well as the outer limit of movement of the buffer member 8. The center stem 6, projects into the recessed end of a collar or follower 14, on the opposite side of which is seated the end of a heavy coiled compression spring 15, disposed within a cylindrical extension 16, of a slidable housing 17.

For the purpose of supporting said housing movably between the sills 1 and 2, of the car platform, heavy straps of metal 18 and 19, respectively, are riveted to the webs of the sills, extending horizontally therebetween, and secured upon said straps is a horizontal supporting plate 20. Said housing 17, is provided on its under surface with a chafing or wear plate 21, which is extended forwardly beneath the cylindrical extension 16, of the housing, and said chafing plate rests slidably upon said horizontal supporting plate 20. The housing 17, is rectangular in section, being provided with recesses 22, in the top wall, recesses 23, in the side walls, and recesses 24, in the bottom wall thereof, the latter being disposed directly beneath said recesses 22, in the top wall.

Small rectangular recesses 25, are provided in each of the side walls of the housing 17, at the rear edge thereof, as shown in dotted lines in Figs. 2 and 6, and in full lines in Figs. 1 and 4. Laid upon the bottom wall of said housing 17, is a wear plate 26, and two groups of resilient friction plates 28 and 29, respectively, are interposed within said housing between said wear plate and the top of said housing. Between said groups of resilient friction plates 28 and 29, is a separator 30, and the inner surface of the end wall of said housing 17, is convex, as clearly shown in Fig. 1, so as to contact the end plate of the group of plates 28, at the middle portion thereof and consequently cause arching of said plates against the separator 30, when the housing is moved rearwardly. The rear edge of the top and bottom walls of said housing 17, as clearly shown in Figs. 2, 4, and 6, is provided with inwardly extending ribs or flanges 31, and detachably engaged in the open rear end of said housing is a convex rear follower plate 32, which, as clearly shown in Figs. 5 and 6, is provided with rib extensions 33, behind which the ribs 31, on said housing engage to hold said follower plate within the housing.

Said rear follower plate 32, as clearly shown in Figs. 2 and 6, is provided on its rear surface with horizontally extending ribs 34, to reinforce and strengthen the same. Riveted between the webs of the respective sills 1 and 2, at the rear of the horizontal supporting plate 20, is a heavy ribbed transverse abutment 35, against which said rear follower block 32, bears when the housing 17, is moved rearwardly, and said transverse abutment is provided with a horizontal rib 36, on its front surface, to engage over the lowermost rib of the ribs 34, on said rear follower block, to prevent the same buckling upwardly under heavy stress.

For the purpose of guiding the housing 17, during movement on said plate 20, two Z-shaped brackets are provided, denoted by the reference numerals 37, one on each side of the cylindrical extension 16, of the housing and secured by means of bolts 38, to said horizontal plate 20, with the upper flanges of said brackets engaging over the lower flat or flanged portions of said extension 16, to which said chafing plate is secured, as clearly shown in Figs. 1 and 3.

The operation is as follows:

When the cars are coupled together, thus causing the buffing member 8, to be impelled inwardly, the stems 6 and 7, guide the same during such movement, the lighter coiled springs 11, aiding the heavy coiled spring 15, in resisting such movement, the latter spring being compressed by the center stem 6. The inward limit of movement of the buffing member 8, for compression of the springs 11 and 15, is determined by contact of the follower collar 14, with the end of the cylindrical extension 16, of the housing 17, and further inward movement of the buffing member 8, causes movement as a whole of the gear housing 17, the same sliding upon the plate 20, guided between the brackets 37, on each side thereof. Due to the pivotal connection between the side stems 7, and the buffer member 8, and due to the fact that the center stem 6, merely abuts said members, it is obvious that pivotal movement of the buffer member may take place, as when cars are coupled on a curve. The rear follower plate 32, being prevented from rearward movement by the abutment 35, and centralized by, as shown in Fig. 1, as well as prevented from buckling upwardly, by said rib 36, as the housing 17, is moved, the groups of plates 28 and 29, within said housing are accordingly arched and stressed. Consequently, this secondary type of construction, being capable of absorbing tremendous loads, receives the excessive stress, due to abnormal movement of the buffing member, without the excessive stress being transmitted through the primary gear or coiled spring 15.

The purpose of the rectangular recesses 25, at the end of each of the side walls of the housing 17, is to permit certain of the rear plates in the group 29, to be inserted or removed from the device, as the case may be, either in assembling or dismantling the mechanism. For this purpose a chisel or other suitable tool is inserted through one of said recesses 25, to spring the edge of the outermost plate of the group 29, outwardly beyond the edge of the side wall of the housing 17, and another tool is inserted through the corresponding recess in the opposite wall, whereby the end plate of the group may be driven outwardly thereby from the housing. After two or three plates have been thus removed in this manner, the initial stress on the parts of the gear will be relieved and the rear follower plate 32, may then be moved laterally, disengaging the projections 33, thereon, from behind the ribs 31, of the housing. This type of buffer gear is so constructed that it may be inserted into that type of platform frame wherein a casing is formed integral with the platform structure.

I am aware that various details of construction may be varied through a wide range without departing from the principles of this invention, and I therefore do not purpose limiting the patent granted otherwise than necessitated by the prior art.

I claim as my invention:

1. A buffing mechanism for railway cars, comprising a plurality of longitudinal sills, a buffing member at the end of the sills provided with a pair of auxiliary supporting stems and an intermediate main stem, a bracket mounted on the outer face of each sill and engaging the auxiliary stems, an abutment plate connected to the inner face of each sill, shock absorber means interposed between the main stem and said abutment plate, supporting means for said shock absorbing means attached to said sills, a follower block interposed between said shock absorbing means and said abutment plate, and means on said abutment plate for centralizing said follower block.

2. In a buffing mechanism for railway cars the combination of a buffing member, a stationary abutment, resilient means interposed between the buffing member and the abutment, a movable housing inclosing said resilient means, a member movable relatively to the said housing, and detachably connected therewith for compressing the resilient means of the housing, and co-acting means on said stationary abutment and on said member adapted to hold said member from buckling upwardly under heavy stresses.

3. In a device of the class described the combination with the platform sills and buffing member of a car, of a housing movably mounted between said sills, absorption gear mechanism within said housing, a follower plate removably engaging said housing to retain said absorption gear mechanism in place, a rigid abutment secured between said sills coacting with said mechanism to resist rearward movement of said housing and also acting to centralize said follower plate, resilient means in the forward end of said housing coacting with said buffing member to resist rearward movement of said buffing member relative to said housing, and mechanism transmitting the stress directly from said buffing member to the housing before the limit of stress to said resilient means has been imposed thereon to bring said absorption gear mechanism into operation.

4. In a device of the class described the combination with the platform sills and buffing member of a car, of a plurality of stems secured to said buffing member extending slidably and rearwardly through the platform end sill of the car, a housing disposed between said sills and capable of movement therebetween, guiding members for said housing, resilient means associated with the forward end of said housing to resist rearward movement of said buffing member, brackets secured on the platform sills to receive the outer stems of said buffing member slidably therethrough, coiled springs disposed around said stems to resist movement of said buffing member, an absorption gear mechanism within said housing to resist movement of the housing when the stress is transmitted directly thereto from said buffing member, and a follower plate removably engaging said housing to retain said absorption gear mechanism in place and also coact with said abutment to centralize the follower plate when the gear is stressed.

5. In a device of the class described the combination with a platform buffer, of a buffing gear therefor comprising a movable housing, a primary gear mounted in one end thereof to resist relative movement of said buffer with respect to said housing, a secondary gear mounted in said housing to resist movement thereof, a follower block engaged in one end of said housing to co-act with said secondary gear, ribs on said block, a stationary abutment member to resist movement of the block, and a rib on said member engaging between the end walls and between certain of the ribs on said block to centralize said block with respect to the gear when the gear is stressed.

6. In a platform buffing gear a fixed abutment secured to the platform frame, a follower block forming a part of said gear, and means on said abutment to engage said follower block to centralize the same when said gear is stressed.

7. In a device of the class described a platform buffing gear comprising a movable housing, primary and secondary buffing gears therein adapted to be brought into operation successively, a fixed abutment, a follower block for coaction with the secondary gear, and means on said abutment for engagement with said block to centralize the same and prevent upward movement thereof when said gears are stressed.

In testimony whereof I have hereunto subscribed my name in the presence of two subscribing witnesses.

ARTHUR C. DAVIDSON.

Witnesses:
CHARLES W. HILLS, Jr.,
FRANK K. HUDSON.